United States Patent
Ryan et al.

(10) Patent No.: US 6,914,758 B2
(45) Date of Patent: Jul. 5, 2005

(54) METHOD AND APPARATUS FOR PREVENTING ESD AND EOS DAMAGE IN MANUFACTURING MAGNETORESISTIVE EFFECT READ HEADS

(75) Inventors: Patrick Joseph Ryan, St. Paul, MN (US); Song Sheng Xue, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 189 days.

(21) Appl. No.: 10/610,165

(22) Filed: Jun. 30, 2003

(65) Prior Publication Data

US 2004/0075955 A1 Apr. 22, 2004

Related U.S. Application Data

(60) Provisional application No. 60/419,989, filed on Oct. 21, 2002.

(51) Int. Cl.[7] ................................................. G11B 5/33
(52) U.S. Cl. ............................................... 360/323
(58) Field of Search ........................... 360/313, 316; 29/603.07; 451/5

(56) References Cited

U.S. PATENT DOCUMENTS

| | | | |
|---|---|---|---|
| 5,465,186 A | 11/1995 | Bajorek et al. ............. 360/113 |
| 5,491,605 A | 2/1996 | Hughbanks et al. ........ 360/113 |
| 5,597,340 A | * 1/1997 | Church et al. ................ 451/5 |
| 5,748,412 A | 5/1998 | Murdock et al. ........... 360/113 |
| 5,772,493 A | 6/1998 | Rottmayer et al. ............. 451/5 |
| 6,054,330 A | 4/2000 | Phipps et al. .................. 438/3 |
| 6,219,205 B1 | 4/2001 | Yuan et al. ................. 360/319 |
| 6,275,361 B1 | 8/2001 | Wallash et al. ............. 360/323 |
| 6,400,534 B1 | 6/2002 | Klaassen .................... 360/323 |
| 6,456,465 B1 | 9/2002 | Louis et al. ................ 360/319 |
| 6,507,466 B1 | 1/2003 | Hayashi et al. ............. 360/323 |
| 6,650,511 B2 | * 11/2003 | Hsiao et al. ................. 360/323 |
| 6,760,197 B2 | * 7/2004 | Boutaghou et al. ......... 360/316 |
| 2002/0066177 A1 | * 6/2002 | Takada et al. ........... 29/603.07 |
| 2003/0026046 A1 | * 2/2003 | Yamakura et al. .......... 360/316 |
| 2004/0179310 A1 | * 9/2004 | Lam et al. .................. 360/316 |

* cited by examiner

*Primary Examiner*—Tianjie Chen
(74) *Attorney, Agent, or Firm*—Westman, Champlin & Kelly, P.A.

(57) ABSTRACT

A magnetoresistive head apparatus includes first and second readers. The first reader is a magnetoresistive reader. The second reader provides electrostatic discharge protection for the first magnetoresistive reader. The second reader can be a second magnetoresistive reader having substantially the same film structure as the first reader. The second reader can also include a phase change thin film, which has high and low resistance states that are changeable using a laser.

20 Claims, 7 Drawing Sheets

Low Resistance State

High Resistance State

METHOD AND APPARATUS FOR PREVENTING ESD AND EOS DAMAGE IN MANUFACTURING MAGNETORESISTIVE EFFECT READ HEADS

CROSS-REFERENCE TO RELATED APPLICATION

This application claims priority from U.S. Provisional Application No. 60/419,989 filed on Oct. 21, 2002 for inventors Patrick Joseph Ryan and Song Sheng Xue and entitled NOVEL METHODS TO PREVENT ESD AND EOS DAMAGE IN MANUFACTURING CPP TYPE MAGNETO-RESISTIVE EFFECT READ HEADS.

FIELD OF THE INVENTION

The present invention relates generally to the manufacture of magnetoresistive (MR) heads, and more particularly but not by limitation to methods and apparatus for preventing electrostatic discharge (ESD) and electrical overstress (EOS) damage during the manufacture of MR heads.

BACKGROUND OF THE INVENTION

Various applications utilize MR heads to sense the presence of a magnetic field. For example, many current hard disc drive data storage systems use heads employing high sensitivity giant magnetoresistive (GMR) readers to read the data from the recording media. Future generation MR heads are expected to use current perpendicular-to-plane (CPP) type readers or sensors. Examples of this type of CPP reader include tunneling magnetoresistive (TMR) readers and CPP spin valve readers. In these future MR heads, as well as in current MR heads, in order to read the data, current is passed through the MR element of the reader. The power dissipated by the MR element generates heat. The heat raises the working temperature of the MR head. The increase in the temperature in the MR head adversely affects the lifetime of the MR head.

When an MR reader or sensor is exposed to an ESD, or even a voltage or a current input larger than that intended under normal operating conditions, referred to as EOS the MR reader may be damaged. As MR readers are made smaller and more sensitive, their susceptibility to ESD or EOS has increased and the voltage at which damage may occur has continued to fall. For example, the family of heads using MR readers in early development of this technology had a failure voltage of approximately 2 volts. That number has dropped to below 0.5 volt for TMR read heads, and can be excepted to continue to fall with technological advances. Therefore, methods to prevent ESD or EOS damage to MR readers or sensors during manufacturing processes is very important.

Numerous techniques for providing ESD or EOS protection have been utilized in the prior art. Some of these techniques utilize diodes or metal oxide semiconductor field effect transistors (MOSFETs) to shunt current away from the MR element of the reader. However, this approach has significant disadvantages. In diode or MOSFET approaches, the turn-on voltage is difficult to control, and may not be small enough to protect the MR element. Also, fabricating a diode or MOSFET with the MR reader significantly increases the number of process steps, since the diode or MOSFET does not have the same structure (number of layers, thickness of layers, materials, etc.) as the MR reader.

Another prior art approach to providing ESD or EOS protection is to fabricate a resistor in parallel with the MR reader. If the protective resistor has a resistance which is significantly smaller then the resistance of the MR reader, a large portion of the damaging current will be shunted across the protective resistor. However, this technique presents challenges and provides disadvantages as well. First, fabrication of a parallel resistor can, in many instances, add additional process steps to the steps required to fabricate the MR reader. Also, the addition of a parallel protective resistor can make it difficult to test the MR reader during the fabrication process. Further, a parallel resistor provides little information to aid in the fabrication process. For example, since a parallel resistor does not react in the same manner to external stimulus, such as the presence of a magnetic field, inclusion of such a resistor renders it more difficult to analyze the response of the MR reader to the stimulus during manufacturing.

Yet another prior art approach to providing ESD or EOS protection is to short out the MR sensor element of the reader. While shorting out the MR sensor element provides very good ESD or EOS protection, it also removes the possibility of testing the MR reader after the short is applied. Ideally, as the MR head goes through the wafer fabrication, slider fabrication, and related processes, it is beneficial to be able to test the MR head at various points.

A technique for providing ESD and EOS protection during MR head fabrication, which addresses one or more these problems or other problems not discussed, would be a significant improvement in the art.

SUMMARY OF THE INVENTION

A magnetoresistive head apparatus includes first and second readers. The first reader is a magnetoresistive reader. The second reader provides electrostatic discharge protection for the first magnetoresistive reader. The second reader can be a second magnetoresistive reader having substantially the same film structure as the first reader. The first and second readers can be connected in parallel so that the second reader shunts current away from the first reader in order to provide the ESD or EOS protection.

In some embodiments, the second reader includes a phase change thin film, which has high and low resistance states that are changeable using a laser.

In some embodiments, the second reader is formed in a dice lane of a wafer such that it can be removed after ESD or EOS protection is no longer required.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
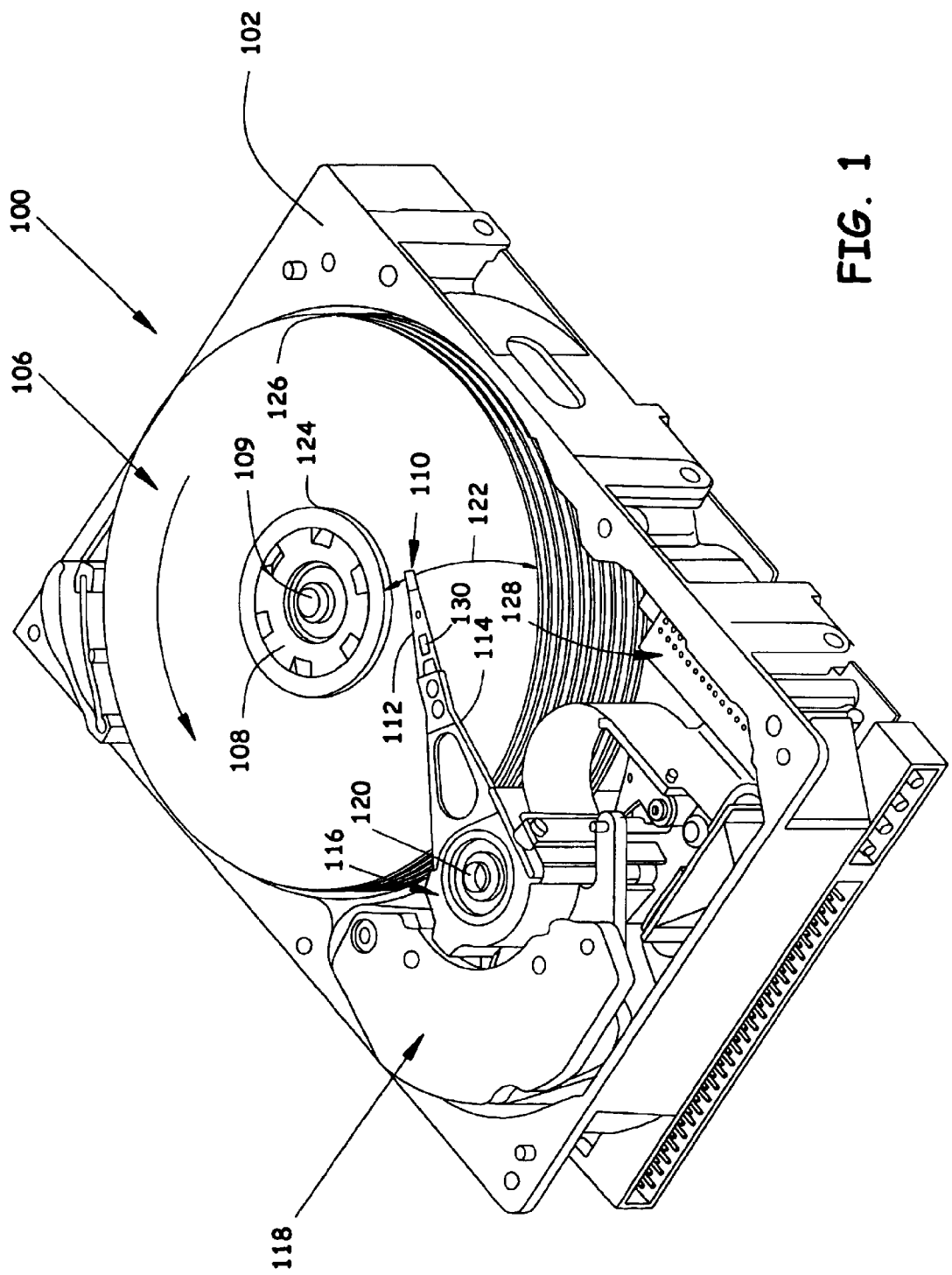
FIG. 1 is an isometric view of a disc drive.

Referring to FIG. 1, a perspective view of a disc drive 100 is shown. The present invention is useful in fabricating MR readers of the MR heads in disc drive 100. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs, which are mounted for co-rotation about central axis 109.

Each disc surface has an associated disc head slider 110 which is mounted to disc drive 100 for communication with the disc surface. Sliders 110 support MR heads for reading data from the disc surface. The MR heads include MR readers or sensors, or in the alternative, the MR heads can be considered to be the MR readers. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a VCM, shown generally at 118. VCM 118 rotates actuator 116 with its attached head 110 about a pivot shaft 120 to position head 110 over a desired data track along an arcuate path 122 between a disc inner diameter 124 and a disc outer diameter 126. VCM 118 is driven by servo electronics (diagrammatically included within electronics 128) based on signals generated by heads 110 and a host computer (not shown). A micro-actuator 130, which provides fine position control of heads 110, is used in combination with VCM 118 that provides relatively coarse positioning of heads 110.

While disc drive 100 is shown in FIG. 1 for illustrative purposes, the present invention is not limited to use with disc drive data storage systems. Instead, the present invention applies to data storage systems which utilize a MR head, to other apparatus or systems which utilize MR heads, and to methods and apparatus for preventing ESD or EOS damage to the heads.

Figure 2A:
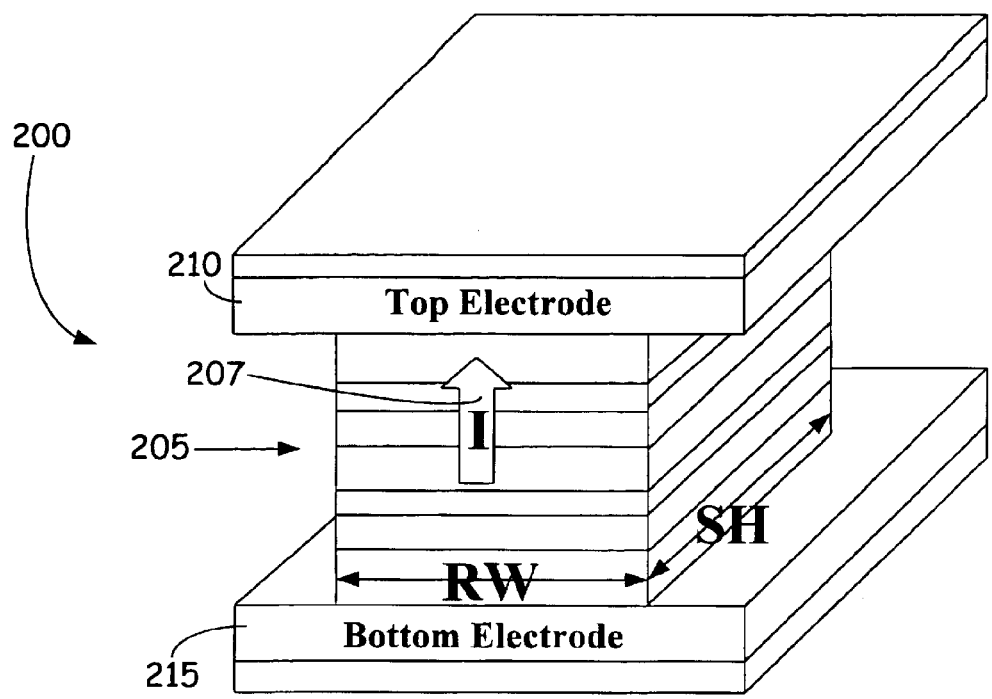
FIG. 2A is a perspective view representation of a CPP type MR reader.

FIG. 2A is a diagrammatic perspective illustration of a CPP type MR reader 200. Reader 200 is of the type fabricated using the methods and apparatus of some embodiments of the present invention. However, the present invention is not limited to use in fabrication of MR heads having CPP type readers. As illustrated in FIG. 2A, CPP reader 200 includes a thin film stack 205 positioned between a top or first electrode 210 and a bottom or second electrode 215. As is known in the art, stack 205 can include a large number of layers, at least some of which comprise magnetoresistive material. Others of the layers in stack 205 are typically materials such as antiferromagnetic materials, spacer layers, seed layers, etc. As indicated by arrow 207, current travels between electrodes 210 and 215 in a direction which is generally perpendicular to the planes in which the layers of stack 205 are formed. The cross-sectional area for CPP reader 200 is equal to the reader width (RW) multiplied by the stripe height (SH).

Figure 2B:
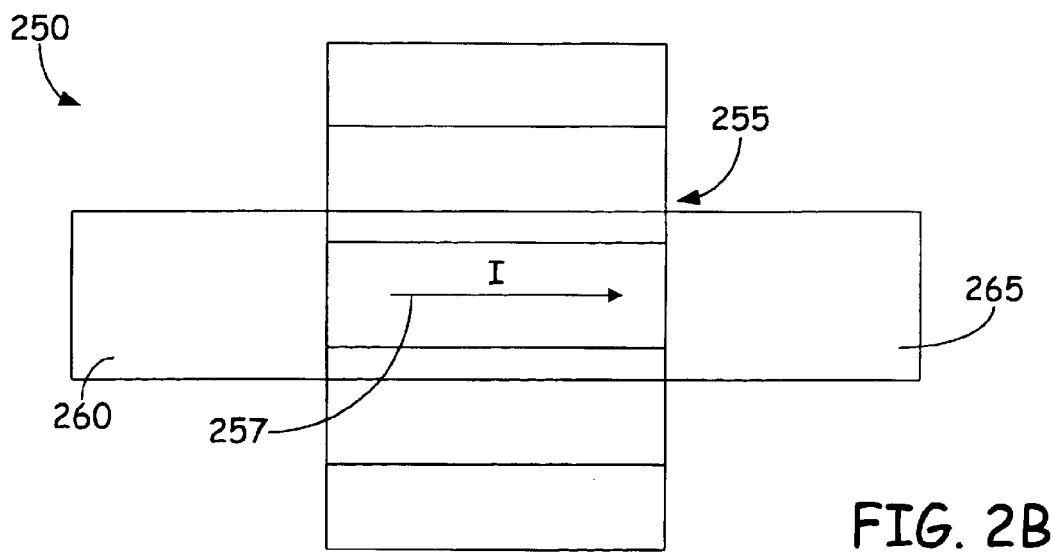
FIG. 2B is a side view representation of a CIP type MR reader.

FIG. 2B is a diagrammatic side view representation of a CIP type reader 250 of the type commonly used in MR read heads. For example, CIP reader 250 can represent a conventional MR reader or a CIP type spin valve reader. CIP reader 250 includes a stack of thin film layers 255, at least one of which is an MR material positioned between electrodes 260 and 265. As was the case with CPP reader 200, in CIP reader 250, stack 255 can include antiferromagnetic pinning layers or bias layers, spacer layers, seed layers, etc. As was the case with stack 205, the number of layers and the arrangement of layers in stack 255 is merely an example, and is not intended to limit the present invention to any particular configuration. In CIP reader 250, current passes between electrodes 260 and 265 in a direction which is generally in the planes of the layers of the stack as illustrated by arrow 257. The MR readers described with reference to the remaining figures can be CIP readers, CPP readers, or other types of magnetoresistive readers.

Figure 3A:
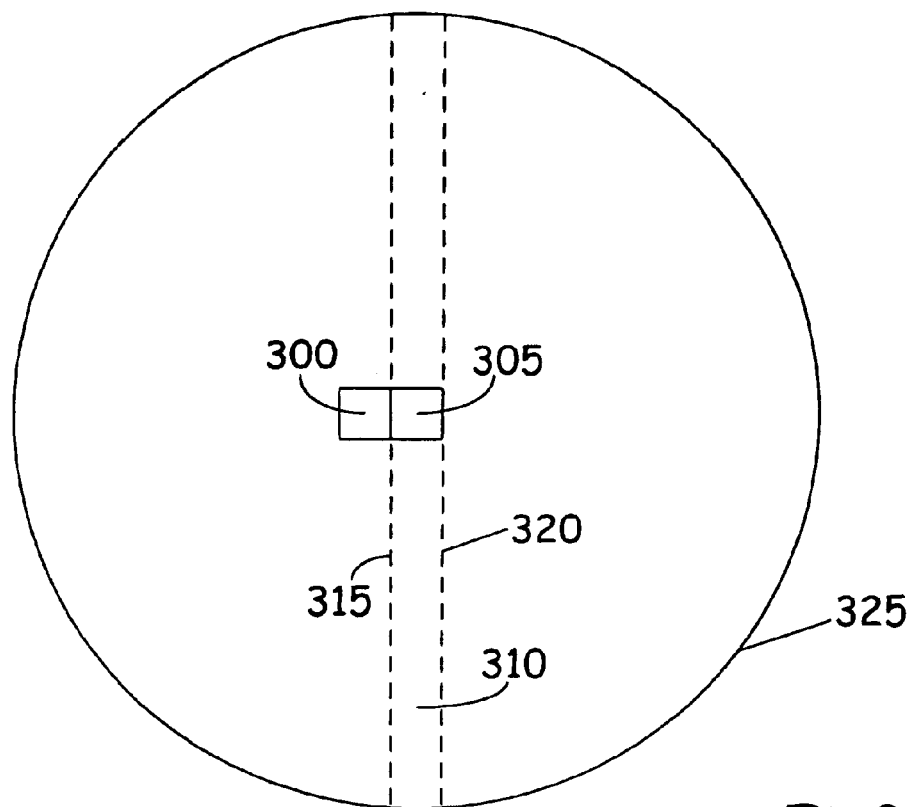
FIGS. 3A and 3B are representations of first and second readers during wafer fabrication processes.
Figure 3B:
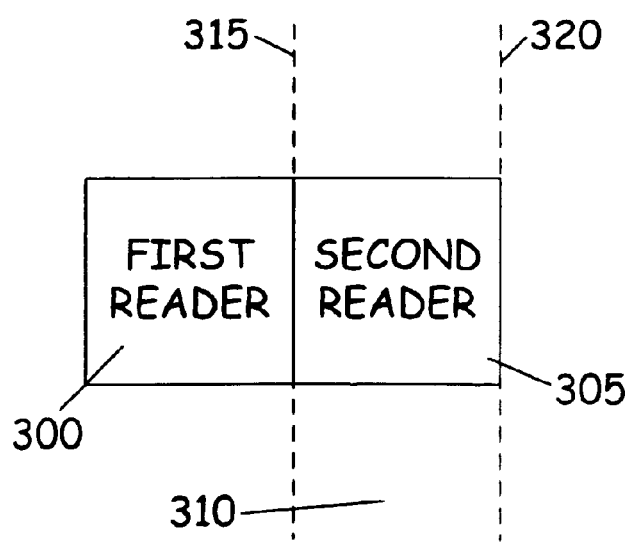

FIGS. 3A and 3B are diagrammatic representations of an MR head apparatus used in the fabrication methods of the present invention. As is shown in these FIGS., during fabrication, a first MR reader 300 (for example such as readers 200 or 250) is formed on wafer 325 using appropriate thin film deposition and masking techniques, as is known in the art. A second reader 305 which provides ESD and EOS protection for first MR reader 300 is also formed on wafer 325. Second reader 305 is formed in a dice lane 310 (illustrated between dashed lines 315 and 320) of wafer 325. Thus, at the appropriate time when wafer 325 is diced into bars, second reader 305 will be removed.

Figure 4:
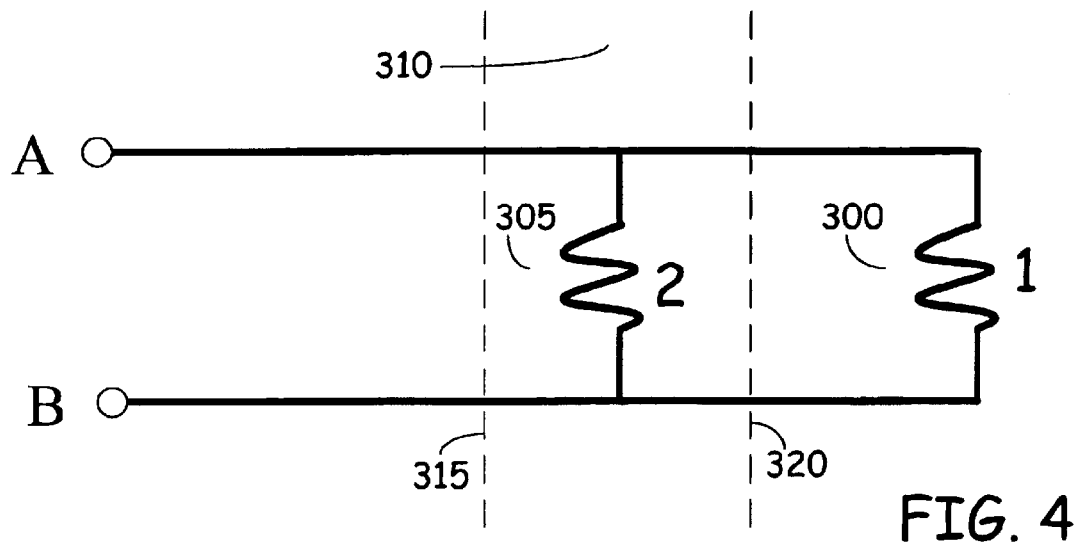
FIG. 4 is a schematic representation of an MR head apparatus of the present invention used to fabricate MR heads while providing ESD and EOS protection to the MR reader.

FIG. 4 illustrates an MR head apparatus including ESD and EOS protection in accordance with the invention. The MR read head 1 (also denoted by reference numeral 300) and the second reader or ESD protection device 2 (also denoted by reference numeral 305) are illustrated as resistances connected in parallel via read leads A and B. As can be seen in FIG. 4, second reader 305 is fabricated within dice lane 310 on the wafer. In some embodiments, first and second readers 300 and 305 are of the same type and have the same film structure. In other words, they include substantially the same layers, and the layers have the same thicknesses. Thus, readers 300 and 305 can be manufactured using these same process steps, providing an advantage in that fabrication of second reader 305 does not add process steps to those already required to fabricate first reader 300. Second reader 305, which provides ESD protection, can be like first reader 300 in most respects, except that the product of the dimensions RW and SH shown in FIG. 2A (and also applicable to FIG. 2B) is considerably larger than the product of the same dimensions in first reader 300. The product of the dimensions, RW×SH (width times height), is at least five times larger than the similar product of these dimensions in first reader 300. Further, it is even more beneficial to have the product of these dimensions be at least ten times larger.

As an example, if the resistance of first reader 300 is 100 Ohms, then the second reader 305 which provides ESD protection will be only 20 Ohms (if the RW×SH product is five times larger), or 10 Ohms (if the RW×SH product is ten times larger). Therefore, the energy dissipation through first reader 300 during an ESD event is greatly reduced since a majority of the current will pass through second reader 305. If the dimension RW for first reader 300 is 0.1 um, then a 1 um RW dimension for ESD device 305 will make its cross-sectional area ten times larger. In the alternative, if the RW dimension is kept constant between the two devices, while the SH dimension is increased to ten times larger for the ESD device 305, the same result will occur. If desired, both of the RW and SH dimensions can be adjusted to increase the ESD device cross-sectional area.

Second reader 305 which serves as the ESD protection device is, in some embodiments, in other respects the same as first reader 300 which serves as the MR reader of the data head. Thus, second reader 305 can be used to test the read head at various points during the wafer manufacturing process. In other words, with the exception of having a much smaller resistance, second reader 305 will react to stimulus in generally the same manner as first reader 300. The advantages of this method and apparatus include the fact that adding second reader 305 does not increase the process content, provides ESD protection by reducing the ESD energy to 10% or less, and preserves the ability to test the read head at various points during wafer manufacturing.

While in some embodiments second reader 305, which provides the ESD and EOS protection during wafer manufacturing processes, is of the same film structure as first reader 300, in other embodiments these two readers have a different film structure. In one such embodiment, second reader 305 includes phase change thin films (PHTs). The resistance of PHT devices can be varied by a factor of approximately 100 by means of a phase transformation of the PHT film(s) from crystalline to amorphous, or vice versa.

Figure 5:
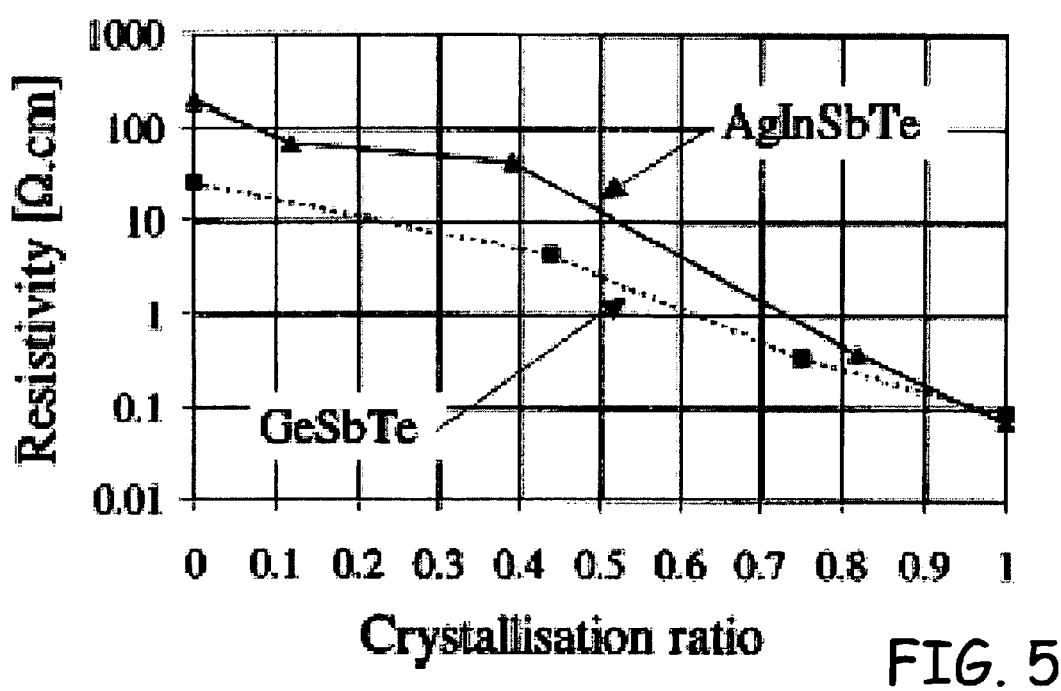
FIG. 5 is a graph plotting resistivity as a function of crystallization ratio for two phase change thin films (PHTs).

FIG. 5 is a graph which plots resistivity of two such PHT films (GeSbTe and AgInSbTe) as a function of the crystallization ratio. A crystallization ratio of zero represents an amorphous state, and a crystallization ration of 1.0 represents a fully crystallized state. The reversible phase change in these PHT films can be achieved using laser beam irradiation.

Figure 6:
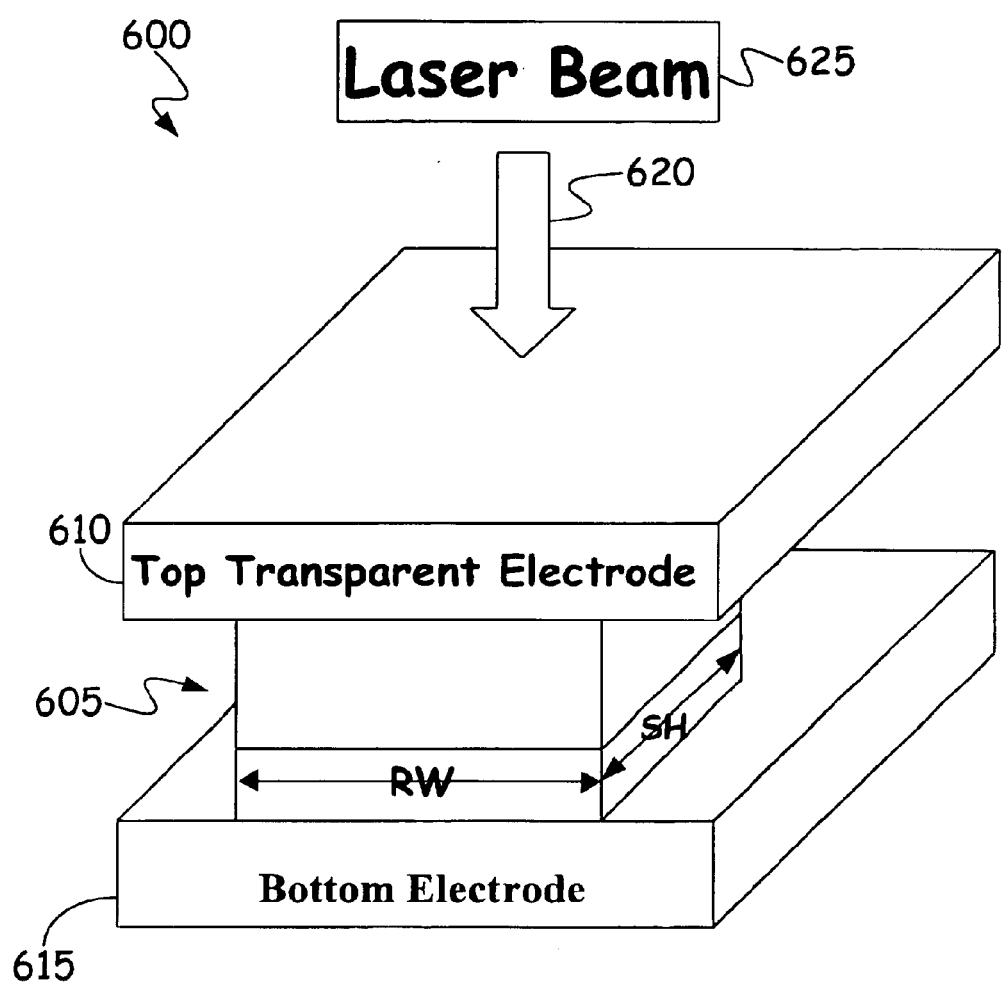
FIG. 6 is a perspective view representation of a PHT reader used to provide ESD and EOS protection for an MR reader.

FIG. 6 is a diagrammatic perspective representation of an ESD device or second reader 600 which can also serve as second reader 305 in some embodiments of the present invention. Reader 600 is a PHT type resistor, and includes one or more PHT thin films positioned between a first or top electrode 610 and a second or bottom electrode 615. In some embodiments, bottom electrode 615 can be made using the same materials used as the bottom electrode in the first reader 305, thus allowing the bottom electrodes of each of the readers to be fabricated using the same process steps. Common materials for the bottom electrode include Al, AlSi, and Cu. A transparent conducting film, such as Indium Tin Oxide (ITO) can be used in conjunction with the bottom electrode to manage the thermal properties of the PHT resistor layers 605. Top electrode 610 should be a transparent material so that a laser beam 620 from laser 625 can be used to make reversible phase changes in the PHT films 605. For example, top electrode 610 can be ITO, or any other transparent conducting film material. A high energy short pulse laser irradiation can make the PHT resistor layers 605 go to high resistance state (i.e., the amorphous state), while a low energy longer pulse laser irradiation can make the PHT resistor layers 605 go to a lower resistance state.

Figure 7:
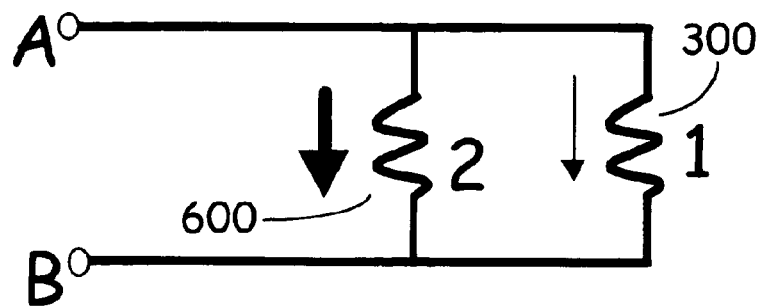
FIG. 7 is a schematic representation of an MR head apparatus with the PHT reader in low and high resistance states.
Figure 7:
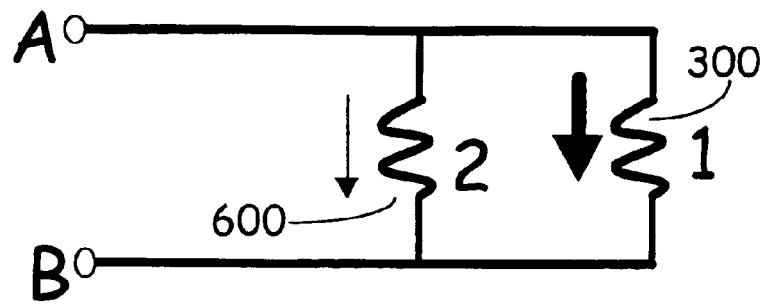

FIG. 7 is a schematic illustration of the resistances of the MR head apparatus during manufacturing with the PHT reader 600 (as a specific embodiment of second reader 305 shown in FIG. 4) in both low resistance and high resistance states. In the low resistance state a majority of the current passes through the ESD device comprised of PHT resistor reader 600. In contrast, in its high resistance state, a majority of the current passes through first reader 300. This allows ESD and EOS protection of first MR reader 300 during certain wafer fabrication steps via the placement of second reader 600 in the low resistance state. It also allows testing of first MR reader 300 during other processing or testing steps via placement of second reader 600 in the high resistance state. As was the case in other embodiments of the present invention, the PHT device embodiments of second reader 600 can be positioned in the dicing lane so that the second reader can be removed from the first reader before fine lapping steps.

Figure 8:
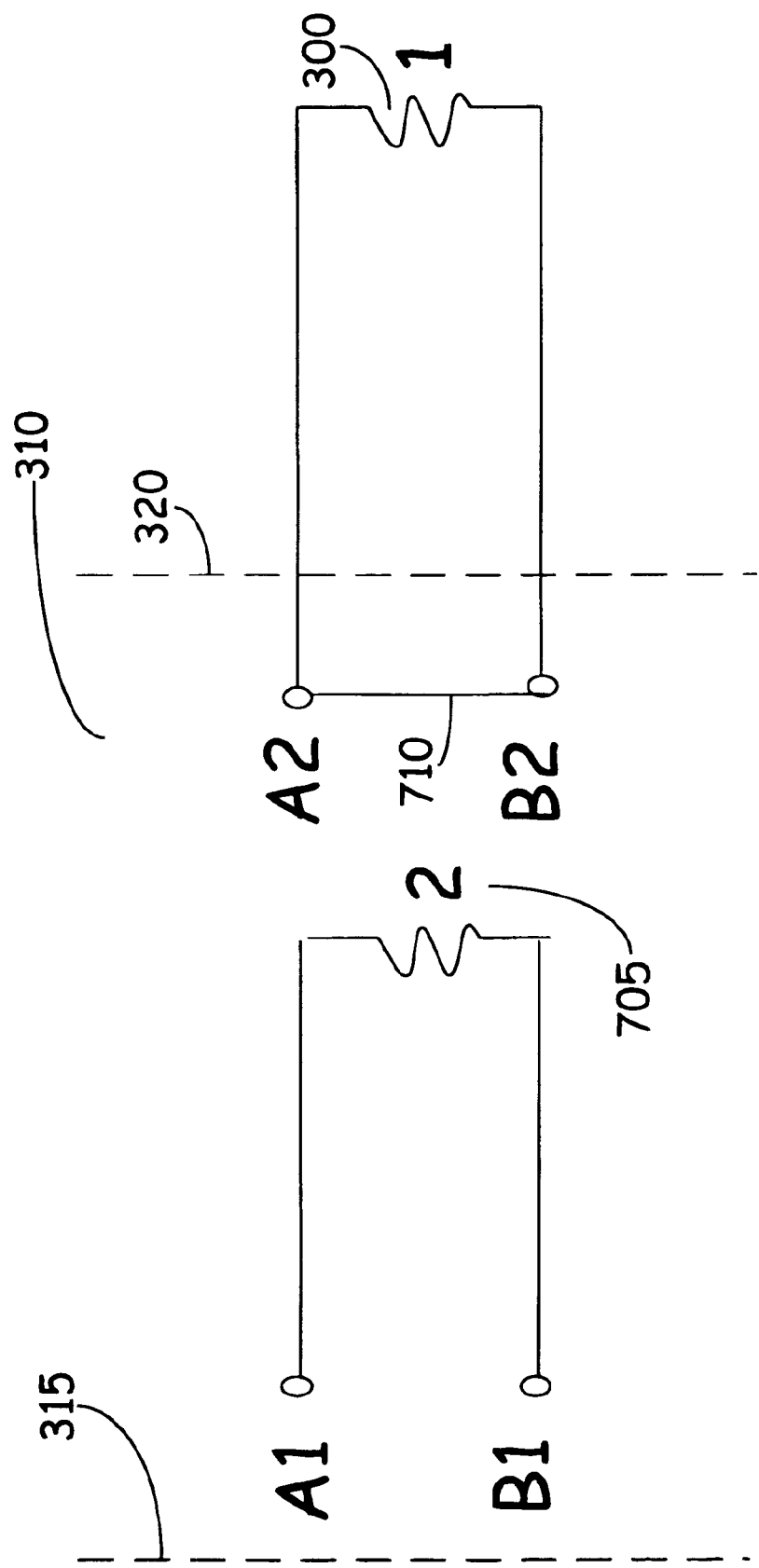
FIG. 8 is a schematic representation of an MR head apparatus in accordance with another embodiment of the present invention.

FIG. 8 is a schematic representation of yet another embodiment of the MR head apparatus and methods of the present invention. In this embodiment, first reader 300 is not connected in parallel with the second reader (denoted by reference numeral 705). Instead, first reader 300 and second reader 705 are accessible using different sets of leads A1,B1 and A2,B2. In this embodiment, a shunt 710 is fabricated across terminals A2 and B2 in order to completely short out first MR reader 300 during wafer processing. Second reader 705 is then used for testing purposes during wafer processing. Second reader 705 (which is a "dummy" reader) has the same structure as first reader 300, and they are processed using the same process steps. However, second reader 705 has a larger cross-sectional area (RW×SH) so that it can withstand higher ESD or EOS events. Like second reader 705, shorting stripe or shunt 710 is positioned in dicing lane 310 so that it can be cut off before fine lapping steps.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the MR heads and MR head apparatus while maintaining substantially the same functionality without departing from the scope and spirit of the present invention. In addition, although the preferred embodiment described herein is directed to a disc drive data storage, it will be appreciated by those skilled in the art that the teachings of the present invention can be applied to other applications using MR heads, without departing from the scope and spirit of the present invention.

What is claimed is:

1. A magnetoresistive head apparatus comprising:
   a first reader, the first reader being a first magnetoresistive reader;
   a second reader providing electrostatic discharge protection for the first magnetoresistive reader.

2. The magnetoresistive head apparatus of claim 1, wherein the first reader and the second reader are fabricated on a wafer, and wherein the second reader is fabricated in a dice lane of the wafer.

3. The magnetoresistive head apparatus of claim 1, wherein the second reader is coupled in parallel with the first reader.

4. The magnetoresistive head apparatus of claim 3, wherein the second reader is a second magnetoresistive reader having a film structure which is the same as a film structure of the first magnetoresistive reader.

5. The magnetoresistive head apparatus of claim 4, wherein the first magnetoresistive reader has first dimensions resulting in a first resistance, and wherein the second magnetoresistive reader has second dimensions resulting in a second resistance, the second resistance being less than the first resistance.

6. The magnetoresistive head apparatus of claim 3, wherein the second reader includes a phase change thin film, the phase change thin film having a low resistance state which results in a resistance of the second reader being less than a resistance of the first reader, and having a high resistance state which results in the resistance of the second reader being greater than the resistance of the first reader.

7. The magnetoresistive head apparatus of claim 2, and further comprising a shunt coupled across the first reader to thereby short the first reader, wherein the shunt is also fabricated in the dice lane of the wafer.

8. The magnetoresistive head apparatus of claim 1, wherein the first reader is a current perpendicular-to-plane magnetoresistive reader.

9. The magnetoresistive head apparatus of claim 1, wherein the first reader is a current parallel-to-plane magnetoresistive reader.

10. A method of producing a magnetoresistive head, the method comprising:
fabricating a first reader on a wafer, the first reader being a first magnetoresistive reader; and
fabricating a second reader on the wafer, the second reader providing electrostatic discharge protection for the first magnetoresistive reader.

11. The method of claim 10, wherein fabricating the second reader on the wafer further comprises fabricating the second reader in a dice lane of the wafer.

12. The method of claim 11, wherein fabricating the first and second readers further comprises fabricating the second reader such that it is coupled in parallel with the first reader.

13. The method of claim 12, wherein fabricating the second reader further comprises fabricating a second magnetoresistive reader having a film structure which is the same as a film structure of the first magnetoresistive reader.

14. The method of claim 13, wherein fabricating the first and second readers further comprising fabricating the first magnetoresistive reader such that it has first dimensions resulting in a first resistance, and fabricating the second magnetoresistive reader such that it has second dimensions resulting in a second resistance, the second resistance being less than the first resistance.

15. The method of claim 12, wherein fabricating the second reader further comprises fabricating the second reader such that it includes a phase change thin film having a low resistance state which results in a resistance of the second reader being less than a resistance of the first reader, and a high resistance state which results in the resistance of the second reader being greater than the resistance of the first reader.

16. The method of claim 11, and further comprising fabricating a shunt in the dice lane coupled across the first reader to thereby short the first reader.

17. A magnetoresistive head apparatus comprising:
a first reader fabricated on a wafer, the first reader being a first magnetoresistive reader;
a second reader fabricated in a dice lane of the wafer in parallel with the first reader, the second reader providing electrostatic discharge protection for the first magnetoresistive reader.

18. The magnetoresistive head apparatus of claim 17, wherein the second reader is a second magnetoresistive reader having a film structure which is the same as a film structure of the first magnetoresistive reader.

19. The magnetoresistive head apparatus of claim 18, wherein the first magnetoresistive reader has first dimensions resulting in a first resistance, and wherein the second magnetoresistive reader has second dimensions resulting in a second resistance, the second resistance being less than the first resistance.

20. The magnetoresistive head apparatus of claim 17, wherein the second reader includes a phase change thin film, the phase change thin film having a low resistance state which results in a resistance of the second reader being less than a resistance of the first reader, and having a high resistance state which results in the resistance of the second reader being greater than the resistance of the first reader.

* * * * *